United States Patent [19]

Danner

[11] 3,825,699

[45] July 23, 1974

[54] CALLING PARTY CONTROL CIRCUIT

[75] Inventor: Dean W. Danner, Waukesha, Wis.

[73] Assignee: GTE Automatic Electric Laboratories, Incorporated, Northlake, Ill.

[22] Filed: Nov. 29, 1972

[21] Appl. No.: 310,308

[52] U.S. Cl. .............................. 179/81 R, 179/6 R

[51] Int. Cl. .............................. H04m 1/64

[58] Field of Search ....... 179/6 R, 81 R, 15 W, 1 C, 179/2 A, 2 DP, 6 E, 84 R, 18 HB; 307/305

[56] References Cited

UNITED STATES PATENTS

| | | | |
|---|---|---|---|
| 3,485,952 | 12/1969 | Walker | 179/6 R |
| 3,716,673 | 2/1973 | Meri | 179/6 R |
| 3,735,158 | 5/1973 | McDonald | 307/252 B |

*Primary Examiner*—Kathleen H. Claffy
*Assistant Examiner*—Joseph A. Popek
*Attorney, Agent, or Firm*—David W. Heid

[57] ABSTRACT

Two circuits are disclosed for loading a telephone line in response to the receipt of incoming ringing signals and includes means responsive to the calling party going on-hook to release the line. A unilateral switching device is included in each circuit for loading and releasing the telephone line. Means responsive to incoming ringing signals are included to trigger the switching device into conduction to load the line.

7 Claims, 2 Drawing Figures

CALLING PARTY CONTROL CIRCUIT

BACKGROUND OF THE INVENTION

This invention relates generally to the field of telephone communications and more particularly to telephone line loading and releasing circuits. The invention disclosed herein is particularly useful in conjunction with telephone answering and recording devices.

In the prior art arrangements many telephone answering and recording machines have their cycle of operation begun by incoming ringing signal and thereafter the machine continues to operate for a fixed time period whether or not the calling party remains on the line. No method of cutting short this fixed cycle is provided since the machine is insensitive to the calling party going on-hook. One scheme of limiting the cycle of operation of a recording device is disclosed in U.S. Pat. No. 3,410,959 issued to R. Lamberg on Nov. 12, 1968. The Lamberg circuit depends upon a polarity reversal being received at the called station upon the calling party going on-hook, and includes a pair of relays which respond to the various changes in line circuit conditions.

SUMMARY OF THE INVENTION

In the present invention two circuits are disclosed which include unilateral switching devices for loading the telephone line in response to the receipt of incoming ringing signals and releasing the line in response to either the cessation of line current or alternatively a battery reversal to the substation produced by the calling party going on-hook. As noted previously, this arrangement is particularly useful with a telephone answering and recording machine to release the telephone line upon the going on-hook of the calling party. The line and the answering machine return to a condition wherein additional incoming telephone calls may be received rather than continuing through a fixed cycle of operation. In one embodiment of the present invention a single unilateral switching device is triggered into conduction upon the receipt of incoming ringing signal and seizes the line to initiate operation of the recording device. An alternative arrangement is disclosed wherein a pair of unilateral switching devices are used to load the telephone line, the pair allowing the circuit to be connected to the telephone line coming from the central office without regard to the polarity of these line conductors.

An object of the present invention is to provide a simplified line loading and releasing circuit which includes a minimum of devices.

Another object of the present invention is to provide a line loading and releasing circuit which is immune to the polarity of the telephone line which is connected thereto.

A still further object of the present invention is to provide a line loading and releasing circuit capable of responding to either a momentary battery reversal to the line conductors or merely an interruption of line current flow to release the telephone line.

DESCRIPTION OF THE PREFERRED EMBODIMENT

Figure 1:
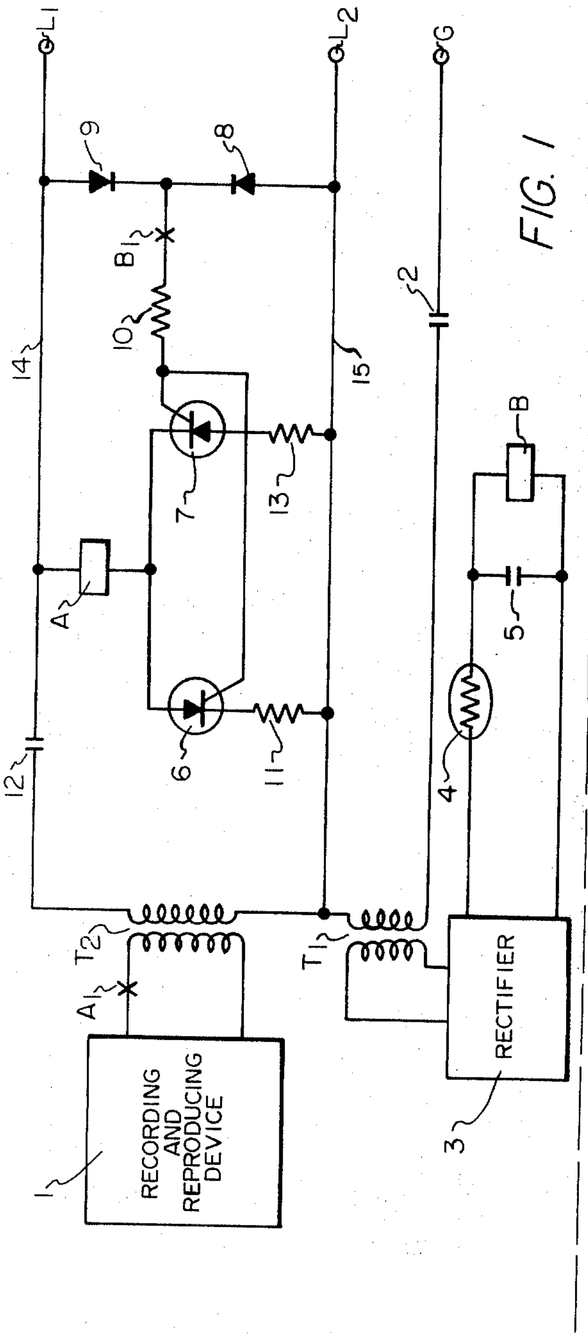
FIG. 1 is a partly block and partly schematic diagram of the line loading and releasing circuit employing a pair of unilateral switching devices.

Now referring to FIG. 1, it will be noted that the circuit is used to interface between incoming line conductors (not shown) which are connected to the circuit at terminals L1 and L2 and a recording and reproducing device designated 1. The ringing signal from the central office to the circuit is applied between terminals L2 and G, which is connected to a local ground (not shown), and is fed to rectifier 3 via coupling transformer T1 and coupling capacitor 2. An incoming ringing signal is rectified by rectifier means 3, timed by the combination of thermistor 4 and capacitor 5 and after the slight delay produced the timing relay B is then energized. It will be appreciated that thermistor 4 and capacitor 5 serve to prevent relay B from operating on spurious pulses which may be received, for example, in the instance where a lightning strikes near the line conductors and induces input transients into the conductors.

The talking path from the central office to recording or reproducing device 1 is via conductors 14 and 15 connected to terminals L1 and L2. The present circuit operates under the standard scheme wherein the central office supplies line voltage to terminals L1 and L2 even though the substation is not in use at the time. Starting the description of the circuit operation, it will be assumed that the station is idle, that is recording and reproducing device 1 is waiting an incoming message. In the idle condition relays A and B are both unoperated. Thus between terminals L1 and L2 the standard line voltage is present, however there is no direct current path from L1 through the circuit back out to L2 since unilateral switching devices 6 and 7 are nonconducting. These unilateral switching devices may take the form of silicon controlled rectifiers, for example. With the central office line connected to terminals L1 and L2 such that the line voltage makes L1 positive with respect to L2, then unilateral switching device 6 would conduct if make contacts $B_1$ of relay B were closed, however this contact closure will take place only upon the receipt of an incoming ringing signal. Correspondingly, if the line from the central office is connected to the circuit such that terminal L2 is positive with respect to terminal L1, then upon the receipt of an incoming ringing signal and operation of relay B, make contacts $B_1$ will close and unilateral switching device 7 would then be allowed to conduct. This operation follows since the control electrode of unilateral switching device 7 receives a positive potential from terminal L2 via diode 8, make contacts B1, and current limiting resistor 10. At this point it will be appreciated that in the absence of an incoming ringing signal, neither of the unilateral switching devices 6 or 7 will conduct since the make contacts $B_1$ will be open.

Assuming that the present circuit is connected to the incoming line circuit from a central office such that L1 is positive with respect to L2, then upon the receipt of a ringing signal, relay B will be operated in a manner previously described. Upon the closure of make contacts $B_1$, unilateral switching device 6 will be gated into conduction since its control electrode will receive a positive potential from terminal L1 through diode means 9, make contacts $B_1$ and resistor 10. With unilateral switching device 6 now gated for conduction, line current will then flow from terminal L1 through relay A, unilateral switching device 6, current limiting resistor 11 and back to the central office via terminal L2. With this D.C. path for conduction completed, in a conventional central office the ringing current will cease and hence relay B will be de-energized. This is of no consequence in keeping the central office line loaded, since once unilateral switching device 6 has been gated on for conduction it will continue to conduct even in the absence of the gating potential initially required.

With the D.C. current path now complete and the line circuit being held through relay A, a communication path between the input terminals L1 and L2 is completed to the recording and reproducing device 1 through coupling capacitor 12, isolation transformer T2 and make contacts $A_1$. Under these conditions, the recording and reproducing device 1 may now give the calling party a prerecorded message and the calling party conversely may leave a message. Conventionally the recording and reproducing device 1 may have a fixed cycle of operation, that is a predetermined outgoing length message is given and a predetermined time is allowed for the calling party to leave its message. Without the present circuit interfacing between the central office lines and recording and reproducing device 1, if the calling party should go on-hook before the recording and reproducing device has run its full cycle, then the line will continue to be tied up and no further incoming messages may be received since recording and reproducing device 1 will continue to operate until the cycle is completed. However with the present circuit, should the calling party go on-hook before the recording and reproducing device has completed its full cycle the line will be released and then become available for another incoming call. This will occur either if the going on-hook by the calling party gives an interruption in line current or if the polarity of the line conductors is reversed with respect to its normal operating polarity.

For example, assume that the calling party goes on-hook before the recording and reproducing device 1 has completed its cycle and that his going on-hook produces a temporary interruption in line voltage and hence a temporary cessation of line current. Under these circumstances the line current through relay A and unilateral switching device 6 will go to zero. Considering the operational characteristic of the unilateral switching device 6, which in this case could be a silicon controlled rectifier, that once the current therethrough goes to zero it will not again conduct until its control electrode receives a gating signal, it will be appreciated that even though there is a re-application of line voltage between L1 and L2 after this line current interruption, the circuit will not again establish a D.C. conducting path since in the absence of a ringing signal neither of the unilateral switching devices will be gated for conduction. In the situation in which the central office gives a reverse battery to the called line when the calling party goes on-hook, terminal L2 will then become positive with respect to L1, whereupon the line current through unilateral switching device 6 will drop to zero and the device will stop conducting. With L2 positive with respect to L1 during this period, unilateral switching device 7 cannot conduct since there is no incoming ringing signal to gate it into conduction. With the cessation of line current through relay A, relay A will then cease to be energized and accordingly make contacts $A_1$ will return to their normally open position and the recording and reproducing device 1 will recycle to its original origin position wherein it will be ready to receive another incoming call.

It will of course be appreciated by those skilled in the art that if terminals L1 and L2 are connected to the line from the central office such that L2 is positive with respect to L1, then a similar circuit operation will ensue. The operation being such that upon the receipt of incoming ringing signal, relay B will operate and the control electrode of unilateral switching device 7 will receive a positive potential from terminal L2 through diode means 8, make contacts $B_1$ and resistor 10, hence allowing unilateral switching device 7 to begin conduction. This D.C. current will have a path from L2 through current limiting resistor 13, through unilateral switching device 7 and through relay A back to the central office. Relay A will be energized and the D.C. current path will now trip conventional ring trip circuits in the central office and ringing will cease. Now the circuit is in condition to receive the incoming call and will respond to the calling party going on-hook in the manner described heretofore with respect to the connection wherein terminal L1 was positive with respect to L2.

With the foregoing description in mind, it will be appreciated that the line holding and releasing circuit could be implemented in the alternative by using a single unilateral switching device. In the foregoing illustration the circuit would operate when either L1 was positive with respect to L2 or L2 positive with respect to L1. In that implementation it was not necessary that any particular attention be given to which terminal was connected to the positive incoming line from the central office.

Figure 2:
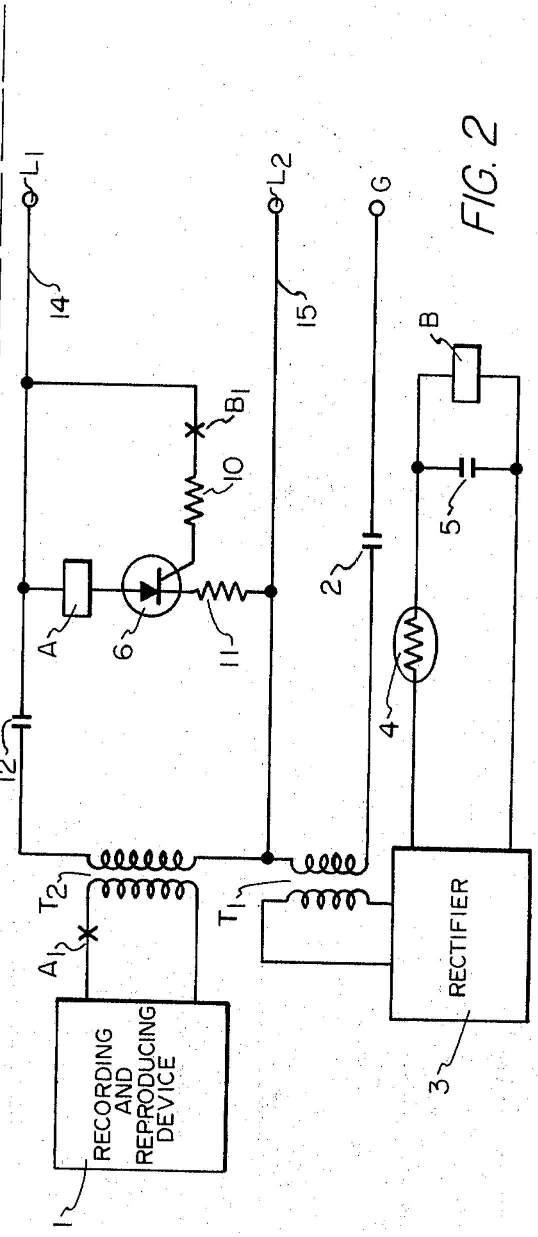
FIG. 2 is an alternative embodiment of a line loading and releasing circuit which utilizes a single unilateral switching device.

As an alternative embodiment to the circuit of FIG. 1, the circuit of FIG. 2 may be used and functions in a similar manner to the FIG. 1 circuit. It will be noted that in FIG. 2 the elements which correspond to those in FIG. 1 are given a corresponding designation. In utilizing the circuit of FIG. 2, it is necessary that the L1 terminal always be connected to the positive line conductor coming from the central office to insure proper operation. However, other than this one requirement no other precautions are necessary and the circuit will function equally as well as the FIG. 1 circuit. It will of course be noted that by using a single unilateral switching device 6, it is not necessary to utilize diodes 8 and 9 to isolate one line conductor from the other and of course the second unilateral switching device is eliminated as well as its associated current limiting resistor.

Although in the foregoing description this circuit has been described with respect to utilization with a recording and reproducing device, it will be apparent that the circuit is equally useful for any arrangement wherein it is necessary to seize the line from the central office in response to an incoming ringing signal and release the line upon the cessation of line current or battery reversal.

What is claimed is:

1. A circuit for loading a telephone line in response to the receipt of incoming ringing signals, said circuit comprising:

first and second unilateral switching devices each having a control electrode;

means for connecting said devices across said telephone line;

first diode means selectively connectible between one conductor of said telephone line and the control electrode of said first unilateral switching device;

second diode means selectively connectible between another conductor of said telephone line and the control electrode of said second unilateral switching device; and means responsive to incoming ringing signals for connecting the control electrodes of said unilateral switching devices to their respective diode means whereby one of said unilateral switching devices is allowed to conduct and said telephone line is loaded.

2. The circuit as claimed in claim 1 wherein said first and second unilateral switching devices comprise silicon controlled rectifiers.

3. The circuit as claimed in claim 1 wherein said means for connecting said devices across said telephone line includes a relay.

4. The circuit as claimed in claim 1 wherein said means responsive to incoming ringing includes a relay.

5. The circuit as claimed in claim 4 including means for rectifying incoming ringing signals and means connecting the output of said rectifying means to said relay whereby upon operation of said relay said diodes are connected to their respective unilateral switching devices and their respective line conductors.

6. A circuit for loading a telephone line in response to the receipt of incoming ringing signals, said circuit comprising:

a silicon controlled rectifier having anode, cathode and gate terminals;

means for connecting said anode to one conductor of said telephone line;

means for connecting said cathode to another conductor of said telephone line; and electromagnetic relay means responsive to ringing signals for connecting a trigger potential to said gate terminal to allow said silicon controlled rectifier to conduct, thereby loading said telephone line.

7. The circuit as claimed in claim 6 wherein the circuit path from said one conductor of said telephone line, through said anode and cathode terminals of said silicon controlled rectifier, to said another conductor of said telephone line includes a relay.

* * * * *